(12) United States Patent
Gulley et al.

(10) Patent No.: US 11,808,689 B2
(45) Date of Patent: Nov. 7, 2023

(54) INTEGRATED BIOCONTAINMENT CELL SORTER

(71) Applicant: Life Technologies Corporation, Carlsbad, CA (US)

(72) Inventors: Lincoln T Gulley, Wellington, CO (US); Daniel N Fox, Bellvue, CO (US); Angela L Goldfain, Fort Collins, CO (US)

(73) Assignee: Life Technologies Corporation, Carlsbad, CA (US)

( * ) Notice: Subject to any disclaimer, the term of this patent is extended or adjusted under 35 U.S.C. 154(b) by 46 days.

(21) Appl. No.: 17/692,234

(22) Filed: Mar. 11, 2022

(65) Prior Publication Data

US 2022/0252502 A1 Aug. 11, 2022

Related U.S. Application Data

(63) Continuation of application No. 16/910,538, filed on Jun. 24, 2020, now Pat. No. 11,307,132.
(Continued)

(51) Int. Cl.
| | | |
|---|---|---|
| *G01N 15/14* | (2006.01) | |
| *G01N 1/22* | (2006.01) | |
| *G01N 15/00* | (2006.01) | |

(52) U.S. Cl.
CPC ......... *G01N 15/1459* (2013.01); *G01N 1/22* (2013.01); *G01N 2001/2223* (2013.01); *G01N 2015/0019* (2013.01); *G01N 2015/149* (2013.01)

(58) Field of Classification Search
CPC ............. G01N 15/1459; G01N 1/22; G01N 2001/2223; G01N 2015/0019;
(Continued)

(56) References Cited

U.S. PATENT DOCUMENTS

| | | |
|---|---|---|
| 3,710,933 A | 1/1973 | Fulwyler |
| 3,963,606 A | 6/1976 | Hogg |

(Continued)

OTHER PUBLICATIONS

Propel Labs, "Meet Bigfoot the Spectral Cell Sorter by Propel Labs (Live Launch Webinar)", May 26, 2020, available at <https://www.youtube.com/watch?v=FC7xMzIGNIo>.

*Primary Examiner* — Roy M Punnoose
(74) *Attorney, Agent, or Firm* — BakerHostetler

(57) ABSTRACT

Disclosed is an integrated biocontainment cell sorter that isolates portions of the cell sorter that can create contamination. Two containment systems are utilized. A main cabinet containment system contains input samples. An aerosol management containment area includes a nozzle chamber with a nozzle and a sort chamber with sort plates and collection media that collect a droplet stream from the nozzle. The main cabinet is maintained at a first low pressure and clean air is recirculated under a positive pressure. The aerosol management containment area is kept at a second low pressure, which is lower than the first pressure, so that contamination does not leak from the aerosol management containment area into the main cabinet containment area. A sliding sash window is located over an access opening in the main cabinet and can be moved to access different portions of the main cabinet without changing the substantially constant first low pressure in the main cabinet.

20 Claims, 5 Drawing Sheets

Related U.S. Application Data

(60) Provisional application No. 62/866,759, filed on Jun. 26, 2019.

(58) Field of Classification Search
CPC ..... G01N 2015/149; G01N 2015/1006; G01N 2035/00277; B01L 2200/141; B01L 1/025
See application file for complete search history.

(56) References Cited

U.S. PATENT DOCUMENTS

| | | | |
|---|---|---|---|
| 4,230,031 A * | 10/1980 | Pedroso | B07B 7/04 454/56 |
| 4,279,345 A | 7/1981 | Allred | |
| 5,641,457 A * | 6/1997 | Vardanega | G01N 15/1404 356/73 |
| 5,711,705 A | 1/1998 | Krainiak et al. | |
| 6,010,400 A | 1/2000 | Krainiak et al. | |
| 6,780,377 B2 | 8/2004 | Hall et al. | |
| 6,881,580 B2 | 4/2005 | Hall et al. | |
| 7,884,301 B2 * | 2/2011 | Kirstein | G01N 15/1459 422/403 |
| 8,557,587 B2 | 10/2013 | Fox et al. | |
| 9,575,050 B2 | 2/2017 | Vrane et al. | |
| 10,989,724 B1 | 4/2021 | Holmes et al. | |
| 11,307,132 B2 * | 4/2022 | Gulley | G01N 1/22 |
| 2002/0042148 A1 | 4/2002 | Monard | |
| 2003/0138967 A1 * | 7/2003 | Hall | G01N 15/1459 436/63 |
| 2003/0146289 A1 * | 8/2003 | Sekhar | F24F 3/0442 165/212 |
| 2019/0072578 A1 | 3/2019 | Buschke | |

* cited by examiner

INTEGRATED BIOCONTAINMENT CELL SORTER

CROSS-REERENCE TO RELATED APPLICATIONS

This application is a continuation of U.S. patent application Ser. No. 16/910,538, "Integrated Biocontainment Cell Sorter" (filed Jun. 24, 2020) (now allowed), which claims benefit to U.S. patent application Ser. No. 62/866,759, "Integrated Biocontainment Cell Sorter" (filed Jun. 26, 2019), the contents of which foregoing applications are incorporated herein by reference in their entireties for any and all purposes.

BACKGROUND

Cell sorter flow cytometers have become an important laboratory tool. Cell sorters are capable of identifying certain types of biological cells and separating those cells from other cells. Commercial uses of cell sorters have also been implemented in several industries. There are many other uses of cell sorters, such as identifying and isolating various types of cells for laboratory applications. As such, cell sorters have many different and varied uses and applications.

SUMMARY

An embodiment of the present invention my therefore comprise an integrated biocontainment cell sorter flow cytometer comprising: a main cabinet of the integrated biocontainment cell sorter that is not hermetically sealed; an input sample area disposed in the main cabinet; a moveable partition in the main cabinet that moves in an access opening of the main cabinet, the moveable partition covering a constant amount of area of the access opening as the moveable partition is moved in the access opening which leaves a constant amount of area of the access opening that is not covered by the moveable partition and is open, as the moveable partition is moved in the access opening; a first fan that draws air from the main cabinet to create a first low pressure in the main cabinet that is substantially constant as the moveable partition is moved in the access opening, which limits contaminated air in the main cabinet from escaping from the main cabinet; an aerosol management containment area that is not hermetically sealed, which is disposed in the main cabinet, the aerosol management containment area having openings that are connected to the main cabinet so that the aerosol management containment area is disposed in and subject to the first low pressure, the aerosol management containment area having a nozzle that creates a droplet stream containing sample cells, sort plates that separate the droplet stream into deflected stream and collection media, that collect the deflected streams; a second fan that draws air from the aerosol management containment area to create a second low pressure in the aerosol management containment area that is lower than the first low pressure which causes air from the main cabinet to flow from the main cabinet to the aerosol management containment area and limits contaminated air from flowing from the aerosol management containment area into the main cabinet; optical excitation devices located outside of the main cabinet and the aerosol management containment area to allow access to the optical excitement devices without accessing the main cabinet or the aerosol management containment area.

Another embodiment of the present invention may therefore comprise a method of containing cells in an integrated biocontainment cell sorter comprising: providing a main cabinet containment area that contains an input area for sample cells to be sorted; generating a first low pressure in the main cabinet using a first fan that draws air from the main cabinet and air from outside the cabinet; generating a second low pressure in an aerosol management containment area, disposed in the main cabinet, using a second fan that draws air from the main cabinet and the aerosol management containment area through openings in the aerosol management containment area to create the second low pressure in the aerosol management containment area that is lower than the first low pressure; enclosing input cell samples in the main cabinet that is not hermetically sealed; enclosing a nozzle, sort plates, collection media and any droplet stream, created by the nozzle, in an aerosol management containment area that is not hermetically sealed; locating optical excitation devices outside of the main cabinet and the aerosol management containment area for easy access for adjustment and maintenance of the optical excitation devices.

DETAILED DESCRIPTION OF THE EMBODIMENTS

Figure 1:
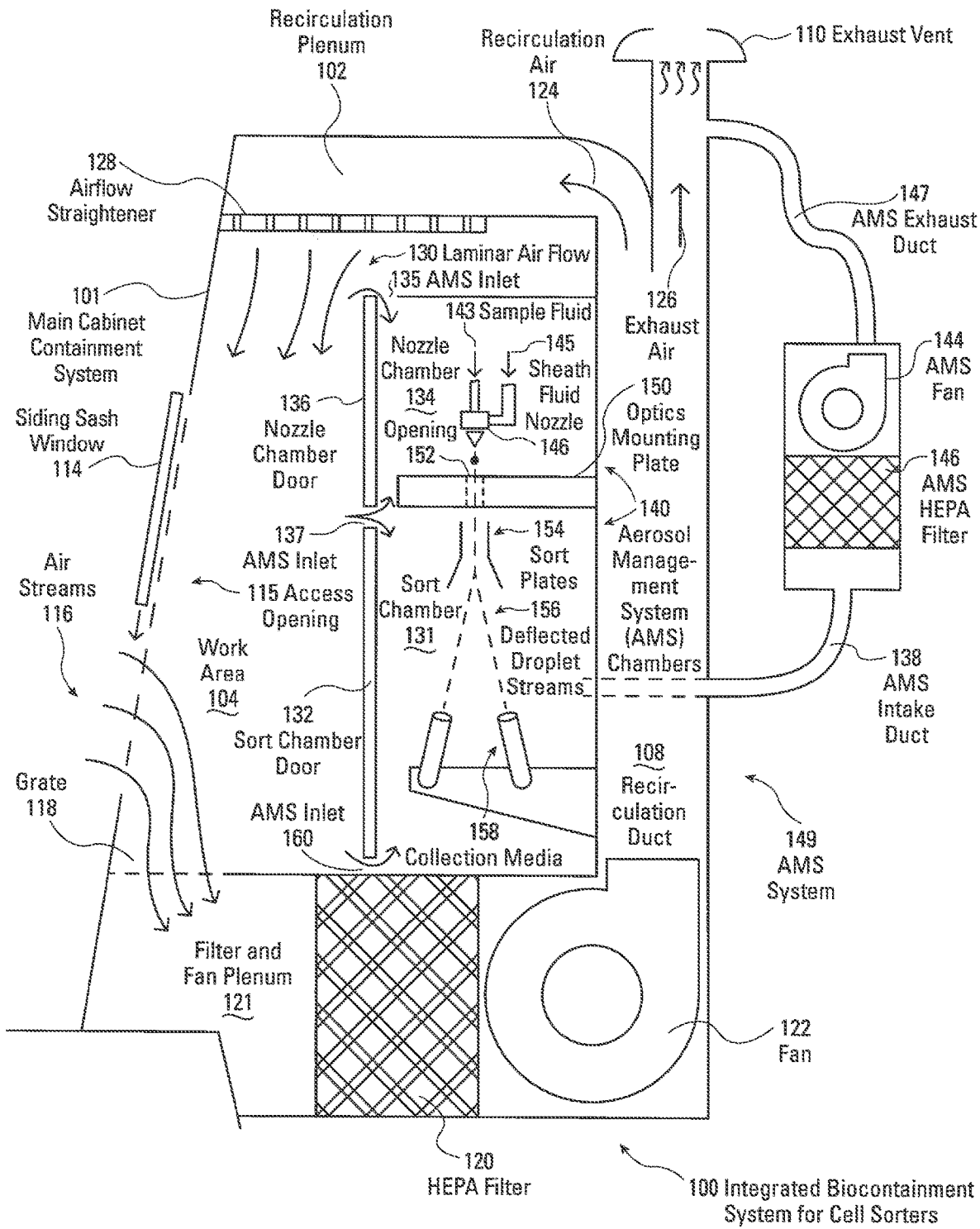
FIG. 1 is a schematic side cutaway view illustrating various parts of one embodiment of an integrated biocontainment cell sorter.
Figure 2:
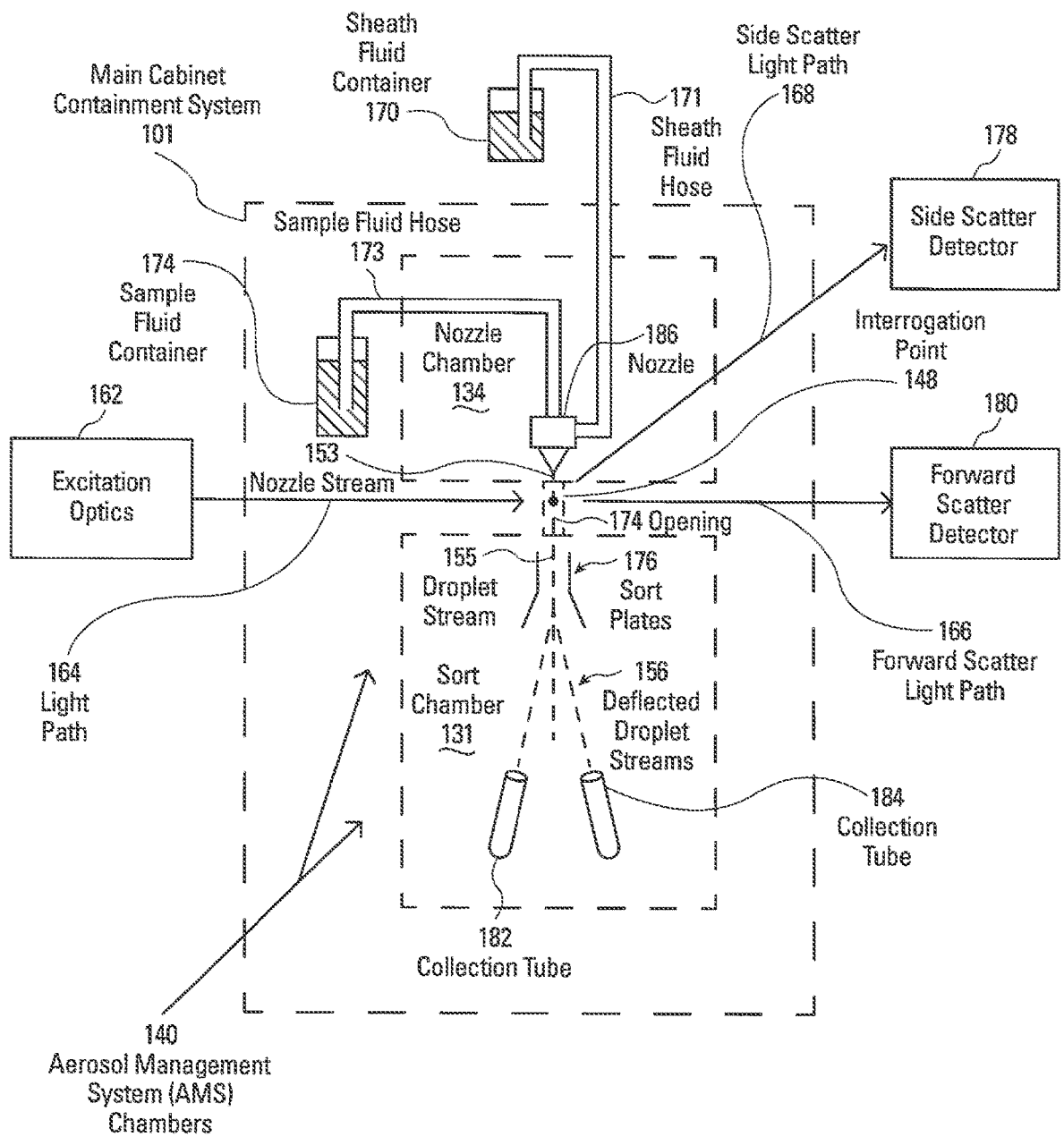
FIG. 2 is a schematic illustration of the Aerosol Management System (AMS) of FIG. 1, including the nozzle chamber and sort chamber and various other parts of an embodiment of an integrated biocontainment cell sorter.

FIG. 1 is a schematic diagram of one embodiment of an integrated biocontainment system 100. The system is comprised of a main cabinet containment system 101 and aerosol management system chambers 140, the AMS intake duct 138, AMS HEPA filter 141, AMS fan 144 and AMS exhaust duct 147, which are collectively referred to as the aerosol management system (AMS) 149. The aerosol management system (AMAS) 149 is contained in or connected to the main cabinet containment system 101. Neither the main cabinet containment system 101 nor the aerosol management system (AMS) 149 are sealed systems. Rather, they rely on movement of air by fan 122, in the main cabinet containment system 101, and AMS fan 144 in the aerosol management system (AMS) 149, to create low pressure, so that harmful and toxic materials are not spread outside of each of these containment systems. For example, a first low pressure is created in the work area 104 of the main cabinet containment system 101 as a result of fan 122 extracting air from both the work area 104 and air from outside of the main cabinet containment system 101, which is shown by air streams 116. In this manner, a first low pressure is created in the work area 104 where potentially toxic or dangerous materials may exist. As long as the fan 122 is able to pull sufficient air through the work area 104, dangerous materials will not escape from the work area 104 to an area outside the main cabinet containment system 101. Dangerous materials primarily exist as aerosols that contain sample cells, Sample cells are mixed with sheath fluid and passed through a nozzle 146. Normally, the nozzle creates a nozzle stream 153 (FIG. 2) that breaks up into a droplet stream 155 (FIG. 2). If the nozzle becomes clogged, an aerosol can be created that contains sample cells. Also, if the nozzle stream 153 or the droplet stream 155 hit a hard surface, aerosols can be created. The aerosols contain sample cells that should not be inhaled or ingested. For example, the sample cells may be cancer cells.

As also shown in FIG. 1, air drawn by the fan 122 first passes through the HEPA filter 120 to remove any dangerous materials such as sample cells. Consequently, the air drawn by the fan 122 is clean air and the fan is not contaminated. The fan 122 forces the clean air through the recirculation duct 108 under positive pressure, which also remains clean. The recirculation duct 108 and recirculation plenum do not have to be sealed, even though they are under positive pressure, since they contain clean air. Part of the air from the fan 122 is exhausted out of the exhaust vent 110, as illustrated by exhaust air 126. At the same time, some of the air from the fan 122 is recirculated, as illustrated by recirculation air 124. Hence, the recirculation duct 108 circulates clean air under positive pressure, and clean air is recirculated into the recirculation plenum 102 under positive pressure, while the remaining air is exhausted out of the exhaust vent 110. The recirculated air in the recirculation duct 108 and the recirculation plenum 102 is under positive pressure and as such may leak from these ducts to the outside air or to other parts of the integrated biocontainment system 100. Since the air under positive pressure is clean air, there are no problems with contamination, unlike many other containment systems. The recirculated air in the recirculation plenum 102 passes through an airflow straightener 128. The airflow straightener 128 is a device that has openings that cause the recirculated air to flow into the work area 104 as a substantially uniform, laminar air flow 130 with low turbulence. Low turbulence allows for maintenance of a uniform downward volume of air that prevents both contaminates from the inside of the cabinet from escaping the user access opening and prevents contaminates from the outside of the cabinet from depositing on the products present inside the cabinet.

The aerosol management system chambers 140 have openings that connect to the main cabinet containment system 101, as also illustrated in FIG. 1. The aerosol management system (AMS) 149 has a separate AMS HEPA filter 141 and a separate AMS fan 144. AMS fan 144 draws air from the AMS intake duct 138, which is connected to the sort chamber 131. Since the aerosol management system chambers 140 are connected by openings to the main cabinet containment system 101, the aerosol management system chambers 140 are already at the first low pressure that is maintained in the main cabinet containment system 101. AMS fan 144 further lowers the pressure in the aerosol management system (AMS) 149 from the first low pressure of the work area 104 to a second low pressure that is lower than the first low pressure. When the nozzle chamber door 136 is opened, or the sort chamber door 132 is opened, the second low pressure in the aerosol management system chambers 140 will equalize with the first low pressure of the main cabinet containment system 101, So, as the pressures of the main cabinet containment system 101 and the aerosol management system chambers 140 equalize as a result of either the nozzle chamber door 136 or the sort chamber door 132 being opened, air initially flows from the main cabinet containment system 101 to the aerosol management system chambers 140 which prevents aerosols from escaping the aerosol management system chambers 140. However, once the pressures are equalized, there can be a migration of aerosols from the aerosol management system chambers 140 to the main cabinet containment system 101. Consequently, prior to opening either the nozzle chamber door 136 or the sort chamber door 132, the nozzle 146 is shut down and the AMS fan 144 is operated at an increased speed for a time to evacuate all aerosols from the aerosol management system chambers 140. During operation, with the nozzle chamber door 136 and the sort chamber door 132 closed, the second low pressure air in the aerosol management system chambers 140 draws air from the work area 104 of the main cabinet containment system 101 at AMS inlet 135 and AMS inlet 137 and AMS inlet 160. In other words, air from the man cabinet containment system 101 in the work area 104, which is at a first low pressure, is drawn into the aerosol management system chambers 140 since the second low pressure in the aerosol management system chambers 140 is lower than the first low pressure in the work area 104 while the nozzle chamber door 136 and sort chamber door 132 are closed. Again, this is a result of the AMS fan 144 drawing air from the aerosol management system chambers 140 through the AMS HEPA filter 141 via AMS intake duct 138 to the outside environment. Clean air that has been filtered by the AMS HEPA filter 141 and drawn by the AMS fan 144 is exhausted through the AMS exhaust duct 147 to the exhaust vent 110. Accordingly, the aerosol management system (AMS) 149 is not only a parallel containment system to the main cabinet containment system 101, the aerosol management system chambers 140 are connected by air inlets to the main cabinet containment system 101 to create a second lower pressure, which makes it doubly hard for dangerous materials located in the aerosol management system chambers 140 and the work area 104 to escape from the integrated biocontainment system 100.

As further illustrated in FIG. 1, the aerosol management system chambers 140 are carefully constructed to enclose portions of the cell sorter that produce hazardous particles and not enclose portions of the cell sorter that do not produce hazardous particles, to minimize the size of the containment area and consequently minimize the size of the integrated biocontainment system 100 for cell sorters. As shown in FIG. 1, the nozzle chamber 134 contains the nozzle 146 which is fed sample fluid 143 and sheath fluid 145. The nozzle 146 creates a nozzle stream 153 (FIG. 2) from the sample fluid 143 and sheath fluid 145 that passes through the interrogation point 148 and through an opening 152 in the optics mounting plate 150. Since the sample 143 may contain dangerous materials, e.g., dangerous cells that can be dispersed in aerosol form when nozzle 146 is clogged, the nozzle 146 is contained within the nozzle chamber 134 to prevent any dangerous aerosols from escaping the aerosol management system chambers 140. The optics mounting plate 150 separates the nozzle chamber 134 from the sort chamber 131. Opening 152 allows the interrogated droplet stream 155 (FIG. 2) to pass through the optics mounting plate 150 to the sort plates 154. Each droplet of the droplet stream 155 (FIG. 2) that is interrogated at interrogation point 148 is then separated by the sort plates 154. The deflected droplet streams 156 are then collected by the collection media 158. This is explained in more detail in U.S. Pat. No. 8,557,587 issued on Oct. 15, 2013 to Fox et al., which is specifically incorporated herein, by reference, for all that it discloses and teaches.

The main cabinet containment system 101 is primarily used to contain the sample input area 107 (FIG. 5) from the ambient air outside of the main cabinet containment system 101. The sample input area 107 is located in the lower portion of the main cabinet containment system 101. The samples are placed in the sample input area 107 that is part of the work area 104. The samples may comprise biohazardous material. They are first prepared in a protected area such as a large dedicated biosafety cabinet that is independent of the biocontainment cell sorter system disclosed herein. The cell samples are suspended in water and then capped to reduce the risk of contamination of the cell sample when removed from the large dedicated biosafety cabinet and transported to the integrated biocontainment cell sorter of the present invention. This reduces the risk of contamination from unwanted foreign material that these cell samples could be subjected to during transport to the integrated biocontainment cell sorter. Since the cells are suspended in water, there is a very low risk of accidental exposure to a user. Even when the cap on the sample media is removed, there is low risk of exposure to the user, since the cells are not in an aerosol form and are suspended in water. However, the user should wear safety glasses and gloves to reduce the risk of exposure from accidental splashing of the sample into the eyes or mouth. Once the user places the capped sample tubes in the sample input area 107, the tubes can be uncapped in a clean environment in the sample input area, so that there is a very low likelihood of contamination of the sample. Tubes are then placed in the sample input holders so that a sorting process can commence.

Figure 5:
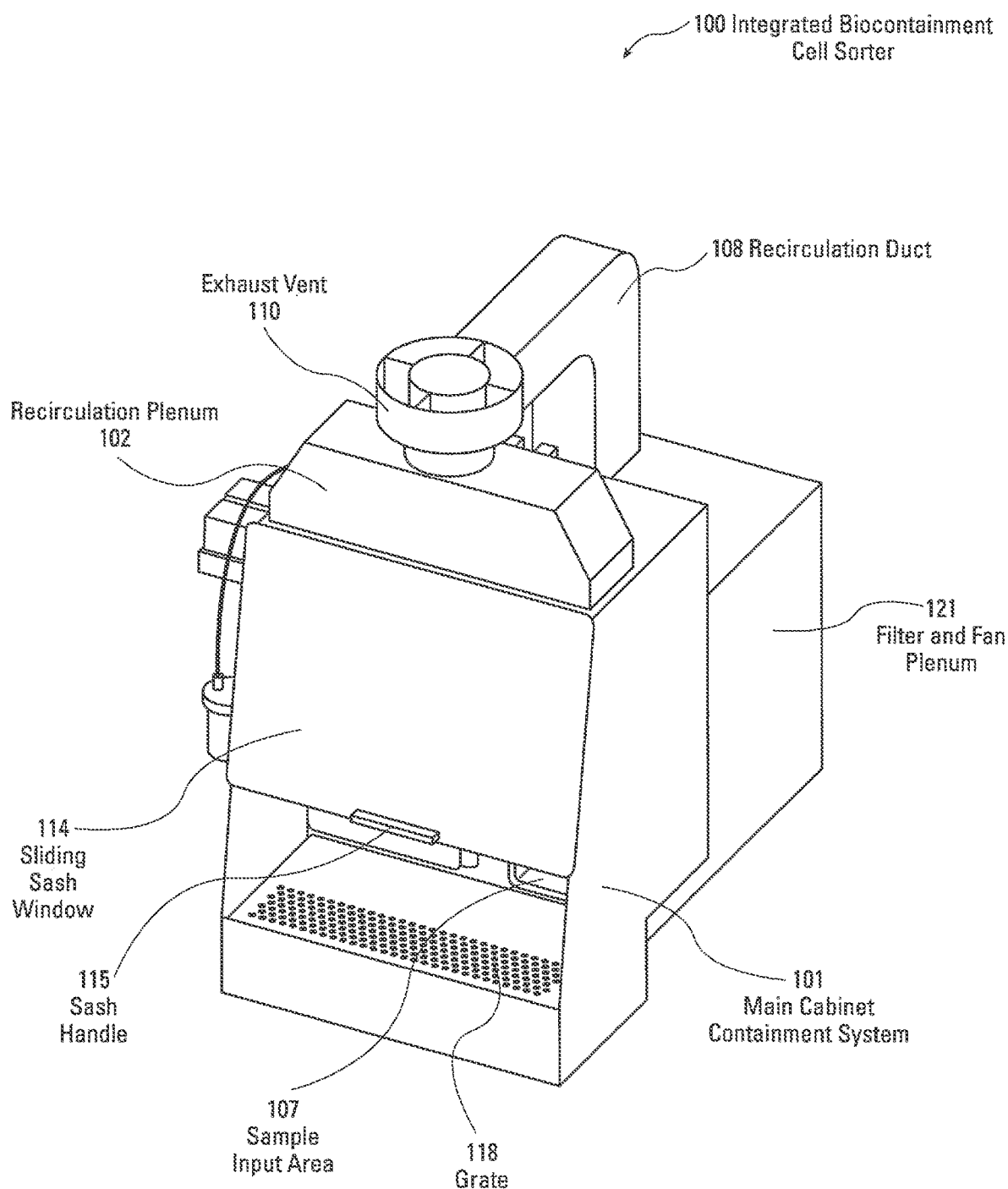
FIG. 5 is a perspective view of an implementation of the integrated biocontainment cell sorter that is illustrated in FIGS. 1-4.

The main cabinet containment system 101, illustrated in FIG. 1, may therefore contain dangerous cells in the sample input area 107. The partition 114, which may comprise a transparent sliding sash window, allows an operator to easily access the sample input area and the sort chamber 131, through the sort chamber door 132 when the partition 114 is in an upper position in the access opening 115, as shown in FIG. 1, to insert and remove samples in the sample input area 107 (FIG. 5). The partition 114 can be moved to a lower position in the access opening 115 to allow direct access by an operator to the nozzle chamber 134, through nozzle chamber door 136. Fan 122 is sufficiently strong to maintain a low pressure in the work area 104 even though the access opening is only partially covered by the partition 114. The partition 114 can simply move up and down in the access opening 115. Accordingly, the amount of area that is closed or blocked off in the access opening 115 by the partition 114 and the amount of area that is open in the access opening 115, and is not closed or blocked off by partition 114, does not change no matter where the partition 114 is placed in the access opening 115. In other words, the same amount of open area of the access opening 115 is present no matter where the partition 114 is located in the access opening 115. When the partition 114 is located in the up position, as illustrated in FIG. 1, a certain number of square inches of opening in the access opening 115 are present. When the partition 114 is moved downwardly, the amount of open area in the access opening 115 has a constant size, i.e. the same number of square inches of opening, since the partition 114 has a constant size and the access opening 115 has a constant size. In this manner, the amount of air that is transported by fan 122 can remain the same no matter where the partition 114 is located and still maintain a constant first low pressure in the work area 104. In one embodiment, the fan 122 moves about 100 feet of air per minute through the user access opening 115 into the work area 104. Functionally, the integrated biocontainment cell sorter system is based on the velocity of the air that moves through the cabinet. The velocity of the air must be fast enough in order to maintain containment since the integrated biocontainment cell sorter is not a sealed system. In operation, the air speed of the air that enters the grate 118 is measured to ensure proper velocity to maintain containment. The fan 122 is designed to operate so that the volume of air that passes through the grate 118 is sufficient to maintain the containment of hazardous materials in the main cabinet containment system 101.

Figure 3:
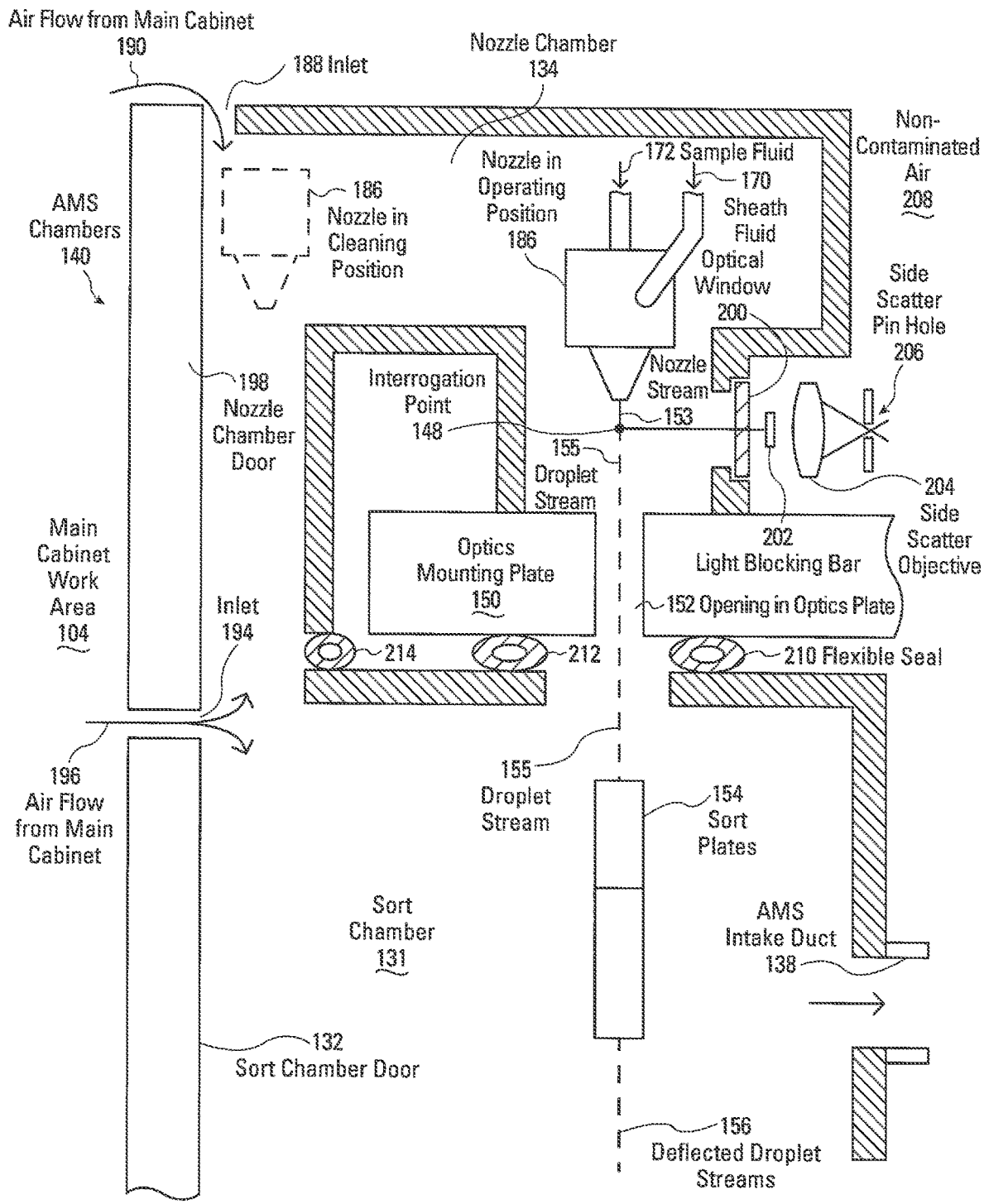
FIG. 3 is a more detailed side cutaway view illustrating the nozzle chamber and the sort chamber of FIG. 2.

FIG. 2 is a schematic diagram illustrating portions of the aerosol management system (AMS) 149. FIG. 2 specifically illustrates the portions of the cell sorter that are contained within the aerosol management system chambers 140. The nozzle 186, as well as the connecting tubing, are located in the nozzle chamber 134. The sort plates 176, collection tubes 182, 184 are located in the sort chamber 131. Opening 174 allows the droplet stream 155 to flow from the nozzle chamber 134 to the sort chamber 131 through the optics mounting plate 150 (FIG. 3). FIG. 2 illustrates the primary components that are located within the nozzle chamber 134 and the sort chamber 131 that comprise the aerosol management system chambers 140. FIG. 2 also schematically illustrates the main cabinet containment system 101. As illustrated in FIG. 2, the nozzle 186 and the connecting hoses are located in the nozzle chamber 134. Sheath fluid container 170 contains sheath fluid that is transported to the nozzle 186 via the sheath fluid hose 171. Sheath fluid hose 171 passes through the walls of the main cabinet containment system 101 and the aerosol management system chambers 140. Containment seals between the sheath fluid hose 171 and the walls of the main cabinet containment system 101 and the aerosol management system chambers 140 walls are not containment seals that provide an airtight seal for the sheath fluid hose 171. Rather, a less expensive and easier to install seal can be used since both the main cabinet containment system 101 and the aerosol management system chambers 140 have low pressures that cause airflow inwardly into the main cabinet containment system 101 and the aerosol management system chambers 140. The same is true for the sample fluid hose 173.

Figure 4:
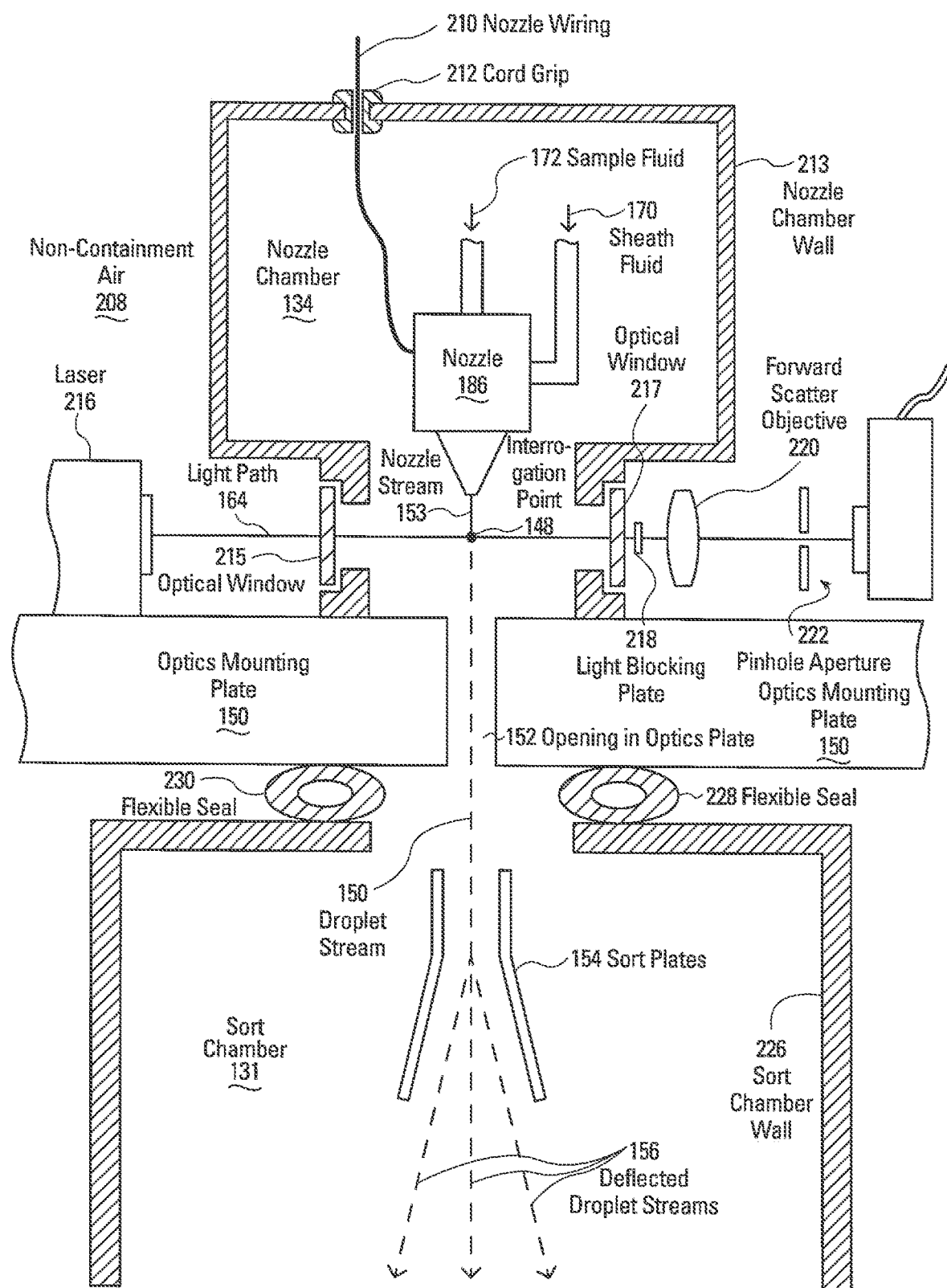
FIG. 4 is a detailed front view of an embodiment of an integrated biocontainment cell sorter showing the nozzle chamber and sort chamber of FIGS. 2 and 3.

As also illustrated in FIG. 2, the aerosol management system chambers 140 surround the sort plates, collection tubes 182, 184 and the deflected droplet streams 156. The nozzle chamber 134 and the sort chamber 131, as well as the opening 174 between these two chambers, comprise the aerosol management system chambers 140. The nozzle 186, the opening 174, the sort plates 176 and the collection tubes 182, 1.84 are the primary functional components that are contained within the aerosol management system chambers 140. The sample fluid container 172, which is placed in the sample input area 107 (FIG. 5) opens into the main cabinet containment system 101, and not in the aerosol management system chambers 140. The sheath fluid container 170, the excitation optics 162, the forward scatter detector 180 and the side scatter detector 178 are preferably all located outside of the main cabinet containment system 101. The side scatter light path 168 and the forward scatter light path 166 project light through an optical window, as illustrated in FIG. 4, to side scatter detector 178 and forward scatter detector 180, respectively. Other electronics and controllers, as well as lasers, are preferably located outside of the main cabinet containment system 101. For example, as disclosed in U.S. Pat. No. 8,557,587, which is specifically incorporated herein by reference, for all that it discloses and teaches, timing and charge circuits, sort logic controllers, optical filters, detectors, acquisition electronics, and other electronic circuits and devices, collectively defined herein as cell sorter electronics and optical devices, are preferably all located outside of the main cabinet and the aerosol management containment area for easy access for maintenance and adjustment. In other words, the cell sorter electronics and optical devices are preferably located in areas that are easily accessed, and do not require access to contaminated areas within the main cabinet containment system 101 or the aerosol management system chambers 140. Consequently, the excitation optics 162, the side scatter detector 178 and the forward scatter detector 180 can preferably be easily accessed without accessing a biocontainment area. Typically, these devices need adjustment, and the accessibility of these devices, without the necessity of entering a dirty or biocontainment area, greatly increases the speed and maintenance of the system.

Of primary importance in easing the maintenance and reducing the size of a containment system is to have the excitation optics 162 located outside of the main cabinet containment system 101 and the aerosol management system 149. The excitation optics 162 comprises the excitation lasers or other excitation optics such as LEDs, optically pumped plasma light generators, arc lamps or other excitation optics. The optics include the various mirrors, beam combiners, lenses, etc. Accordingly, the present invention, in accordance with one embodiment, may simply have the excitation optics 162 located outside of the main cabinet and the other portions, such as the side scatter detector 178, forward scatter detector 180, and other devices located inside of the main cabinet 101 and aerosol management system chambers 140. However, the optical detection devices, such as side scatter detector 178 and forward scatter detector 180, may also be located outside of the main cabinet 101 along with the excitation optics 162, in accordance with another embodiment of the present invention, and as illustrated in FIG. 2. As a third embodiment of the present invention, the fluidics, such as the sheath fluid container 170, the various pumps associated with the sheath fluid, may also be located outside of either the aerosol management system chambers 140, or the main cabinet containment system 101, either individually or collectively. In other words, various combinations of equipment can be located outside of the main cabinet 101 and/or the aerosol management system chambers 140 to increase accessibility and increase the ease of maintenance of various systems and also reduce the size of the containment area.

Further, by creating an integrated system, which is specifically constructed so that only the nozzle and connecting hoses are in the nozzle chamber 134 and the sort plates 176 and collection tubes 182, 184 are in the sort chamber, the volume of the main cabinet containment system 101 is greatly decreased. Many cell sorter systems are simply placed in a containment hood, which is very large and bulky. For example, containment hoods are typically about nine feet high and can be six or seven feet wide. By only enclosing specific components in the present invention, the containment area can be greatly reduced and the overall size of the integrated biocontainment system 100 can also be greatly reduced. By containing sample fluid container 172 in the input sample area 107, which is adjacent to the work area 104 of the main cabinet containment system 101, input fluids can be easily inserted and removed from the input sample area 107 since the sample fluid container 172 does not impose as much of a hazard as aerosols that can be created in the nozzle chamber 134 and the sort chamber 131. In addition, the use of aerosol management system chambers 140 having openings to main cabinet containment system 101 provides additional safety for the operators since they are not subjected to any of the hazardous particles that are contained in the aerosols of the aerosol management system chambers 140.

FIG. 3 is a schematic cutaway side view of the aerosol management system chambers 140. As illustrated in FIG. 3, the nozzle chamber 134 contains the nozzle 186, which is illustrated in solid lines in the operating position. Sheath fluid 170 is provided through the nozzle 186, as well as the sample fluid 172. The nozzle 186 can also be moved to a cleaning position, as illustrated in dotted lines. The nozzle chamber door 198 can be opened so that the nozzle 186, in the cleaning position, is accessible through the nozzle chamber door 198. Nozzles, such as nozzle 186, can become clogged for various reasons, and a quick and easy access to the nozzle 186 is provided when the nozzle 186 is in the cleaning position. Again, when the nozzle chamber door 198 is opened, the negative pressure in the nozzle chamber 134, compared to the main work area 104, is equalized so that contaminated air can at that point in time migrate from the nozzle chamber 134 to the main work area 104. The droplet stream 155 from the nozzle 186 flows through an opening 152 and the optics mounting plate 150. The droplet stream 155 passes through an interrogation point 148 prior to the droplets separating from the stream. Laser beams interrogate the nozzle stream 153 at the interrogation point 148. Scattered and projected light from the interrogation point 148 is transmitted through the optical window 200 and past the light blocking bar 202 to a side scatter objective 204. Side scatter objective 204 collects the side scatter rays and transmits those rays through side scatter pin hole 206. Flexible seals 210, 212 and 214 provide a partial seal so that the droplet stream 155 does not transfer to the non-containment air 208. The droplet stream 155 passes through sort plates 154 and is separated into deflected droplet streams 156. The AMS intake duct 138 is connected to the AMS HEPA filter 141 and the AMS fan 144, as illustrated in FIG. 1. Air from the sort chamber 131 is drawn through the AMS intake duct 138 to create a low pressure in both the sort chamber 131 and the nozzle chamber 134. Air from the main cabinet work area 104 passes through inlets 188 and 194, Airflow 190 from the main cabinet passes through inlet 188, while airflow 196 from the main cabinet passes through inlet 194. The sort chamber 131 has a sort chamber door 132 that can be opened to provide operator access to the sort plates 154 and collection tubes 182, 184 (FIG. 2) in the sort chamber 131. Again, because the sort chamber 131 has lower pressure than the main cabinet work area 104, opening of the sort chamber door 132 equalizes the pressure of the sort chamber and the main cabinet work area 104. To prevent hazardous aerosols from escaping the sort chamber 131 or nozzle chamber 134, both the sort chamber 131 and the nozzle chamber 134 must be evacuated using the AMS fan 144 (FIG. 1) prior to opening either the nozzle chamber door 198 or the sort chamber door 132. Once the aerosols are purged from the aerosol management chambers 140, the doors 198, 132 can be opened.

FIG. 4 is a front schematic view illustrating the nozzle chamber 134, the sort chamber 131 and various devices of the cell sorter that are located outside of the aerosol management system (AMS) 149 and the main cabinet containment system 101. As illustrated in FIG. 4, non-containment air 208 surrounds the nozzle chamber wall 213 of the nozzle chamber 134. Laser 216 generates a laser beam along light path 164 that passes through an optical window 215. The laser intersects the nozzle stream 153 at interrogation point 148. Light transmitted from the interrogation point 148 passes through optical window 217 to a light blocking plate 218 and through the forward scatter objective 220, The forward scatter objective 220 collects the light and transmits it through a pinhole aperture 222 to the light detector 224. The droplet stream 155 passes through an opening 152 in the optics mounting plate 150, Flexible seals 228, 230 seal the sort chamber 131 to the optics mounting plate 150. The droplet stream 155 passes through the sort plates 154 in the sort chamber 131 and is separated by the sort plates 154 into deflected droplet streams 156. The sort chamber wall 226 separates the sort chamber 131 from a non-containment air region 208.

FIG. 5 is a perspective view of an embodiment of an implementation of the integrated biocontainment cell sorter 100. As illustrated in FIG. 5, an exhaust vent 110 exhausts clean air out of the integrated biocontainment cell sorter 100. Clean air is provided to the recirculation plenum 102 by the recirculation duct 108. The filter and fan plenum 121 contain the filter and fan in a location that is in the back and the bottom of the integrated biocontainment cell sorter 100 so that other portions of the integrated biocontainment cell sorter 100 are easily accessible to an operator. Sliding sash window (partition) 114 moves with an angular vertical movement to provide an opening to the main cabinet containment system 101. When the sliding sash window 114 is in the upper position, as shown, the sample input area 107 is accessible by an operator. When the sliding sash window 114 is in a lower position, the nozzle chamber 134 and sample line are accessible. Grate 118 allows air from outside of the integrated biocontainment cell sorter 100 to be drawn into the main cabinet containment system 101 so that contaminated air does not pass out of the main cabinet containment system 101. By maintaining a lower pressure in the main cabinet containment system 101, contaminated air does not escape from the integrated biocontainment cell sorter 100.

Accordingly, the integrated biocontainment cell sorter 100 provides containment only around the portions of the cell sorter that may create contaminated air. As such, the integrated biocontainment cell sorter 100 has containment areas that are small and compact, have smaller fans and substantially smaller overall dimensions than cell sorters that are placed in large hoods or partially integrated biocontainment cell sorters. Partially integrated biocontainment cell sorters encapsulate numerous components of a cell sorter that do not require containment, and make it much more difficult to provide maintenance to specific areas of the cell sorter that do not require biocontainment. The smaller containment areas results in smaller fans and requires moving a reduced volume of air to maintain containment, thereby saving energy.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

The invention claimed is:

1. A biocontainment system, comprising:
    a main cabinet, the main cabinet enclosing a work area therein;
    a first fan train,
        the first fan train comprising a first fan and a first filter,
        the first fan being operable to draw air from the main cabinet through the first filter;
    an aerosol management system,
        the aerosol management system comprising a first chamber,
            the first chamber being located within the main cabinet and being in fluid communication with the work area of the main cabinet,
        the aerosol management system comprising a second fan train,
            the second fan train comprising a second fan and a second filter,
        the second fan being operable to draw air from the first chamber through the second filter and to maintain the first chamber at a pressure lower than a pressure of the work area.

2. The biocontainment system of claim 1, wherein the aerosol management system comprises a second chamber, the second chamber being located within the main cabinet and the second chamber being in fluid communication with the work area of the main cabinet.

3. The biocontainment system of claim 2, wherein the second fan is operable to draw air from the second chamber through the second filter and to maintain the second chamber at a pressure lower than a pressure of the work area.

4. The biocontainment system of claim 2, comprising a passage between the first chamber and the second chamber.

5. The biocontainment system of claim 1, wherein the aerosol management system comprises a recirculation duct, the recirculation duct being configured to receive air from the first fan train.

6. The biocontainment system of claim 5, further comprising a recirculation plenum configured to communicate air from the recycle duct to the work area.

7. The biocontainment system of claim 5, further comprising an exhaust vent configured to receive air from the first fan train and communicate the air to the environment exterior to the main cabinet.

8. The biocontainment system of claim 7, wherein the second fan train is in fluid communication with the exhaust vent.

9. The biocontainment system of claim 1, wherein the main cabinet comprises an opening configured to place the main cabinet into fluid communication with the environment exterior to the main.

10. The biocontainment system of claim 1, further comprising an optical system configured to interrogate a sample residing within the aerosol management system.

11. The biocontainment system of claim 10, wherein a portion of the optical system is located outside of the first chamber.

12. The biocontainment system of claim 1, further comprising a particle sorter, the particle sorter located within the aerosol management system.

13. A method of containing material in a biocontainment system, comprising:
    operating a first fan to move air through a first flow path, the first flow path being defined by (i) a work area within a main cabinet, (ii) a first filter, and (iii) a recirculation duct in fluid communication with the work area and with a first exhaust vent; and operating a second fan to move air through an aerosol management system of the biocontainment system,
the aerosol management system comprising (i) the second fan, (ii) a first chamber in communication with the work area, and (iii) a second filter that receives air communicated from the first chamber, the aerosol management system being arranged such that the work area is free of air filtered by the second filter; and
maintaining the first chamber at a lower pressure than the main cabinet.

14. The method of claim 13, wherein the second flow path comprises a second chamber, the second chamber being maintained at a lower pressure than the main cabinet.

15. The method of claim 13, further comprising sorting a plurality of particles located within the second flow path.

16. The method of claim 15, further comprising optically exciting the plurality of particles.

17. The method of claim 13, wherein the second flow path comprises an exhaust vent.

18. A biocontainment system, comprising:
a main cabinet having a work area therein;
a first chamber having a particle processing train located therein,
the first chamber being disposed within the main cabinet,
the first chamber being in fluid communication with the work area; and
a filtration train,
the filtration train being configured to (i) collect and filter air from the work area, (ii) collect and filter air from the first chamber, and (iii) maintain the first chamber at a pressure lower than a pressure of the work area.

19. The biocontainment system of claim 18, wherein the particle processing train comprises a particle sorter.

20. The biocontainment system of claim 18, wherein the filtration train is configured to return filtered air to the work area.

* * * * *